March 15, 1927.

J. SLEPIAN 1,621,034

WIRELESS RECEIVING SYSTEM

Filed Jan. 13, 1922

WITNESSES:
H.B.Funk.
H.L.Godfrey

INVENTOR
Joseph Slepian
BY
Wesley G. Carr
ATTORNEY

Patented Mar. 15, 1927.

1,621,034

UNITED STATES PATENT OFFICE.

JOSEPH SLEPIAN, OF SWISSVALE, PENNSYLVANIA, ASSIGNOR TO WESTINGHOUSE ELECTRIC & MANUFACTURING COMPANY, A CORPORATION OF PENNSYLVANIA.

WIRELESS RECEIVING SYSTEM.

Application filed January 13, 1922. Serial No. 528,969.

My invention relates to methods and means for amplifying currents and more especially to wireless receiving systems.

One object of my invention is to provide an improved wireless receiving system having highly desirable operating characteristics which is responsive to signal impulses from damped and undamped wireless transmission systems.

Another object of my invention is to provide a receiving system of unusual sensitivity, wherein extremely large amplifications of the feeble currents impressed thereon may be readily effected.

Another object of my invention is to provide a means and method of detecting changes in signal currents by causing a corresponding variation in the frequency of recurrence of substantially equal energy impulses in a detecting apparatus.

Other objects of my invention will be apparent from the following description of the nature and the mode of operation and the advantages of my invention.

In the operation of vacuum tubes as oscillation generators, it has been observed that the tubes tend to howl when insufficient grid leak is provided. The howling is caused by the tube oscillating intermittently at an audible frequency. Heretofore, when using vacuum tubes as oscillation generators in wireless receiving or transmission systems, it has been customary to avoid such noises and to increase the grid leak to such value as to admit of the generation of continuous oscillations.

I have observed, however, that the pitch of the howling or intermittent-oscillatory note may be modulated directly in accordance with the amplitude of the signal currents impressed upon the input circuit of the system and that the amplitude of the currents in the output circuit thereof are enormously amplified by reason of such control.

My invention consists further in the details of construction and operation which will be best understood by referring to the accompanying drawing, wherein.

Figure 1:
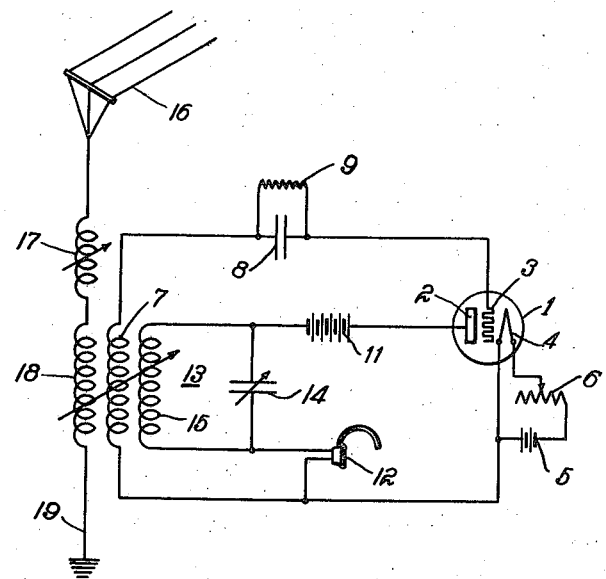
Figure 1 is a diagrammatic view of a simple regenerative system embodying my invention.

In Fig. 1, a three-electrode tube 1 comprising a plate or anode 2, a controlling grid 3 and a hot filament 4, the latter being energized from a direct-current source of energy 5 through a resistor 6, is shown associated with a regenerative system comprising input and output circuits of well known form.

The input or grid-filament circuit includes a coupling coil 7 and a shunt-connected grid condenser 8 and grid leak 9. In practice, the grid leak 9 is adjusted to such value as to cause the tube 1 to oscillate intermittently in a manner hereinafter described. The output or plate-filament circuit includes a source of energy 11, a translating device shown as a telephone receiver 12 and a tuned circuit 13. The tuned circuit 13 comprises a shunt-connected condenser 14 and a coupling coil 15, the latter being inductively coupled to the coupling coil 7 of the input circuit for feed-back action.

An antenna circuit comprises an antenna 16, a tuning inductance coil 17, a coupling coil 18 and a ground lead 19, and is inductively associated with the coupling coils 7 and 15 through coupling coil 18.

In practice, I have found that the circuit constants, and, more especially, the grid-leak values, must be carefully adjusted in order to produce the intermittent oscillatory state wherein large increases in amplification over the well known regenerative system is effected. One set of constants, for carrying the hereinbefore mentioned desired results into effect and applicable to the system of Fig. 1, are as follows:

For received signal impulses of 300 meters wave length, coupling coils 7 and 15 have inductances of a few tenths of a millihenry; condensers 8 and 14 have capacitances of approximately .001 microfarads. The potentials of the direct-current sources of energy 5 and 11 are 4.5 and 60 volts, respectively. The resistance of the gird leak 9 is of the order of megohms. The indicating device 12 has a direct-current impedance of 2000 ohms and the tube 1 is a Marconi detector type of tube. It will be understood, of course, that considerable variation may be made in the value of the above constants without departing from the spirit of my invention and that it is not to be limited to the specific values just mentioned.

The disclosure of my invention may be further completed by an outline of its mode of operation in accordance with theories which seem most plausible in view of my present knowledge of the underlying phenomena, though I do not wish to be limited to such explanation.

In an ordinary type of oscillation-tube circuit, employing a grid condenser and a grid leak, wherein insufficient leak is provided, the grid condenser gradually charges up to the peak value of the alterating potential impressed on the grid, whereupon the oscillations become unstable and stop. When the charge on the grid has decreased to a sufficiently low value, as determined by the constants of the system, the oscillations again build up to the maximum limit of the tube, whereupon the blocking action is again manifested.

Figure 2:
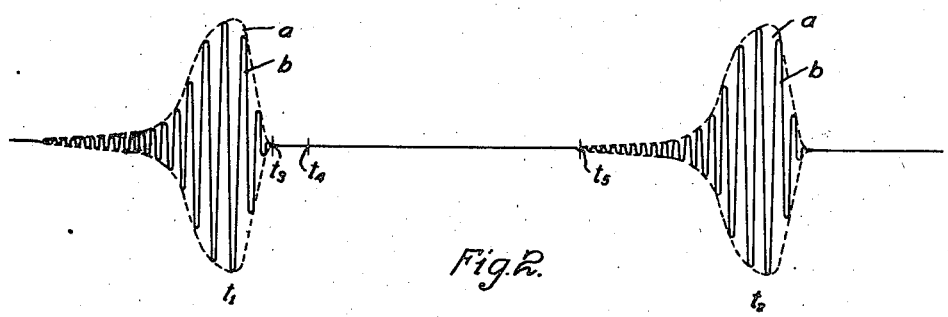
Fig. 2 is a curve diagram showing the envelope of the intermittent oscillations generated by the system, plotted against time.

Such cycle, as just described, is indicated in Fig. 2, wherein curve $a$ represents the envelope of the radio-frequency oscillation $b$ of an intermittently oscillating system having an intermittent oscillatory period $t_1$, $t_2$, which may be within or outside of the audible range. The time interval $t_1$, $t_3$ represents that during which the oscillations are damped from a maximum value to zero. The time interval $t_3$, $t_4$ may represent that necessary for the charge on the grid condenser to be dissipated in the grid leak, while the time interval $t_4$, $t_5$ illustrates that necessary for the minute vibrations in the system to build up to an intensity sufficient to start the tube oscillating again.

Figure 3:
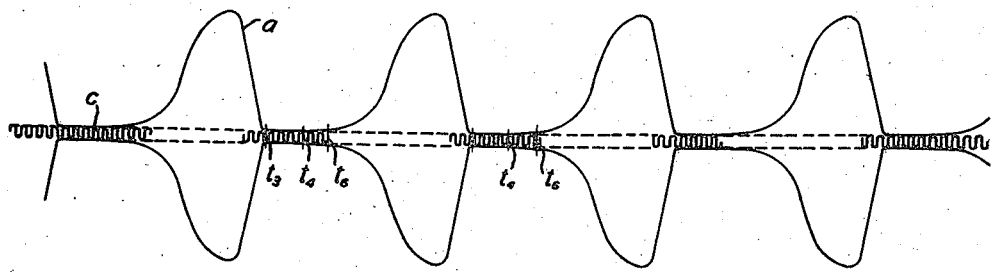
Fig. 3 is a similar view illustrating the effect of received signal impulses upon the intermittent oscillatory period of the system.

In view of the foregoing, it will be observed that, upon the supply of a small amount of energy, as illustrated by the curve $c$ of Fig. 3, corresponding, for example, to the wave form of a received signal impulse, to the intermittently oscillatory system of Fig. 1, the time interval $t_4$, $t_5$ may be decreased to some value $t_4$, $t_6$, thereby increasing the frequency of the intermittent oscillations. It will be further observed that the increase in the frequency of the intermittent oscillations is dependent upon the amplitude of the disturbing impulse impressed upon the system.

In view of the foregoing description, it may readily be seen that my invention is directly applicable to the detection of signal impulse in wireless receiving systems, inasmuch as the intermittent-oscillatory period of the system may be modulated in accordance with the varying intensity of the received signal impulses.

When it is desired to receive telephone signals, the intermittent oscillatory period of the system is adjusted to some value just above the audible range. The effect of the signals in this case is to modulate the energy traversing the telephone receiver 12 in accordance with the varying intensity of the signal. Other applications of my invention, as for the reception of spark signals or continuous-wave telegraph signals, will be readily apparent to those versed in the art.

While I have shown and described a specific embodiment of my invention, it is capable of various changes and modifications without departing from the spirit of my invention and I desire, therefore, that only such limitations shall be imposed thereon as are demanded by the prior art or specifically set forth in the appended claims.

I claim as my invention:—

1. The method of operating an intermittently oscillating regenerative-feed-back circuit for amplifying electrical currents which consists in causing electrostatic charges to be alternately built up and dissipated in a controlling circuit at a super-audiofrequency whereby the oscillations are periodically blocked at such frequency, and causing the frequency of said blocking to be modulated in accordance with said currents which are to be amplified.

2. In combination, a vacuum-tube device having a plate circuit and a grid circuit, said circuits being coupled, a condenser in said grid cricuit, a grid leak around said condenser, the resistance of said grid leak being so chosen with regard to said coupling that the tube is blocked at intervals above audiofrequency, and means for impressing the received signal on said circuits, whereby on the arrival of a signal the frequency of said blocking becomes audible.

In testimony whereof, I have hereunto subscribed my name this 20th day of December, 1921.

JOSEPH SLEPIAN.